(12) United States Patent
Henry et al.

(10) Patent No.: US 9,635,352 B1
(45) Date of Patent: Apr. 25, 2017

(54) SYSTEMS AND METHODS FOR INDICATING IMPROPER VIEWING ANGLES

(71) Applicant: Rockwell Collins, Inc., Cedar Rapids, IA (US)

(72) Inventors: Daniel J. Henry, Cedar Rapids, IA (US); Donald E. Glass, Mukilteo, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/644,353

(22) Filed: Mar. 11, 2015

Related U.S. Application Data (60) Provisional application No. 61/951,050, filed on Mar. 11, 2014.

(51) Int. Cl.
*G09G 3/34* (2006.01)
*H04N 17/00* (2006.01)
*G06T 7/00* (2017.01)
*H04N 13/04* (2006.01)

(52) U.S. Cl.
CPC ......... *H04N 17/004* (2013.01); *G06T 7/0044* (2013.01); *H04N 13/0425* (2013.01); *G09G 2320/028* (2013.01); *G09G 2320/068* (2013.01)

(58) Field of Classification Search
None
See application file for complete search history.

(56) References Cited

U.S. PATENT DOCUMENTS

| | | | |
|---|---|---|---|
| 7,070,299 B2 * | 7/2006 | Williams | B64F 1/20 362/231 |
| 2006/0220904 A1 * | 10/2006 | Jarlengrip | B62D 15/029 340/901 |
| 2012/0223255 A1 * | 9/2012 | Walker | B64F 1/20 250/495.1 |
| 2014/0028809 A1 * | 1/2014 | Bruls | H04N 13/0425 348/51 |
| 2015/0070486 A1 * | 3/2015 | Nakata | G08G 1/0962 348/118 |

\* cited by examiner

*Primary Examiner* — Joseph Haley
(74) *Attorney, Agent, or Firm* — Angel N. Gerdzhikov; Donna P. Suchy; Daniel M. Barbieri (57) ABSTRACT

Methods and systems for indicating boundaries of a volume of space are disclosed. A method may include: providing a first pair of indicators positioned to visually indicate boundaries of a predefined volume of space with respect to a first axis; providing a second pair of indicators positioned to visually indicate boundaries of the predefined volume of space with respect to a second axis; and configuring the first pair of indicators and the second pair of indicators to provide a first type of visual indication visible to a viewer from positions outside of the predefined volume of space. The methods and systems may be utilized for indicating boundaries of a volume of space for proper and/or improper viewing of a display device.

20 Claims, 9 Drawing Sheets

SYSTEMS AND METHODS FOR INDICATING IMPROPER VIEWING ANGLES

CROSS-REFERENCE TO RELATED APPLICATIONS

The present application claims the benefit under 35 U.S.C. §119(e) of U.S. Provisional Application Ser. No. 61/951,050, filed Mar. 11, 2014. Said U.S. Provisional Application Ser. No. 61/951,050 is hereby incorporated by reference in its entirety.

BACKGROUND

Three-dimensional (3D) video images for consumer television and other applications have become widespread. The hardware for 3D video images is well-known and typically involves substantially identical left and right video image channels of the same scene, except that the two image channels are taken from different lateral positions often separated by a few inches, yielding slightly different images so as to mimic views from each of a person's eyes. Viewers usually look at the 3D display via special glasses or Fresnel lenses, which allow each video image channel to effectively reach one eye only, which projects two slightly different images onto the retinas of the viewer's eyes. The viewer's visual cortex processes the binocular disparities of the two slightly different images together in a way that permits 3D, or stereoscopic depth perception.

A 3D display utilizing technologies described above typically requires a viewer to view the images being displayed from within a volume of space in front of the display for optimal 3D viewing. If the viewer's head leaves this volume of space in front of the display, the stereo image visualized by the viewer may be adversely affected, which may create eye strain and may lead to improper viewing of the 3D images, and therefore should be avoided.

SUMMARY

An embodiment of the inventive concepts disclosed herein is directed to a method. The method may include: providing a first pair of indicators positioned to visually indicate boundaries of a predefined volume of space with respect to a first axis; providing a second pair of indicators positioned to visually indicate boundaries of the predefined volume of space with respect to a second axis; and configuring the first pair of indicators and the second pair of indicators to provide a first type of visual indication visible to a viewer only from positions outside of the predefined volume of space.

An additional embodiment of the inventive concepts disclosed herein is directed to an apparatus. The apparatus may include a first pair of indicators positioned to visually indicate boundaries of a predefined volume of space with respect to a first axis and a second pair of indicators positioned to visually indicate boundaries of the predefined volume of space with respect to a second axis. The first pair of indicators and the second pair of indicators may be configured to provide a first type of visual indication visible to a viewer only from positions outside of the predefined volume of space.

A further embodiment of the inventive concepts disclosed herein is directed to a display device. The display device may include a screen. The display device may also include a first pair of indicators positioned to visually indicate boundaries of a predefined volume of space in front of the screen with respect to a horizontal axis and a second pair of indicators positioned to visually indicate boundaries of the predefined volume of space in front of the screen with respect to a vertical axis. The first pair of indicators and the second pair of indicators may be configured to provide a first type of visual indication visible to a viewer only from positions outside of the predefined volume of space.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Figure 1:
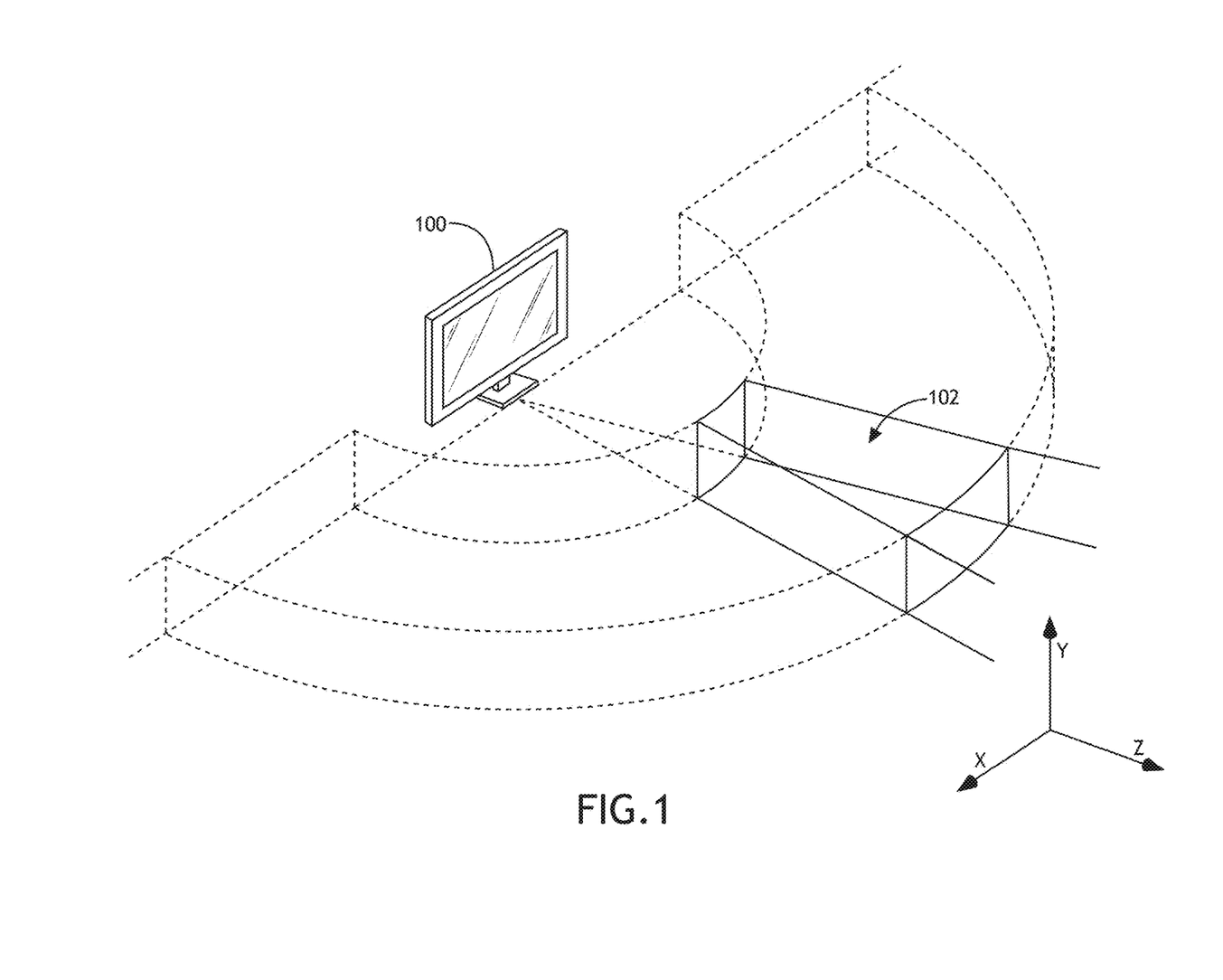
FIG. 1 is an illustration depicting a display device and a volume of space in front of the display device that may provide optimal viewing.

FIG. 1 is an illustration depicting a 3D display 100 and a volume of space (may be referred to as a "head box") 102 in front of the 3D display 100 that may provide optimal 3D viewing. It is to be understood that FIG. 1 has been simplified for illustrative purposes, and that the shape and the size of the head box 102 may vary depending on the specific implementation of the 3D display 100.

In certain instances, it may be important for a viewer of the 3D display 100 to keep the viewer's head position within the head box 102 for proper viewing. More specifically, viewing the 3D display 100 from a horizontal position (x-axis) and/or a vertical position (y-axis) outside of the head box 102 may create undesirable visual effects such as stereo reversal or the like. Furthermore, undesirable visual effects such as stereo reversal may not always be readily apparent to the viewer, and if the viewer is using the 3D display 100 to remotely operate a machine, for example, the consequences of stereo reversal may be detrimental.

Figure 2:
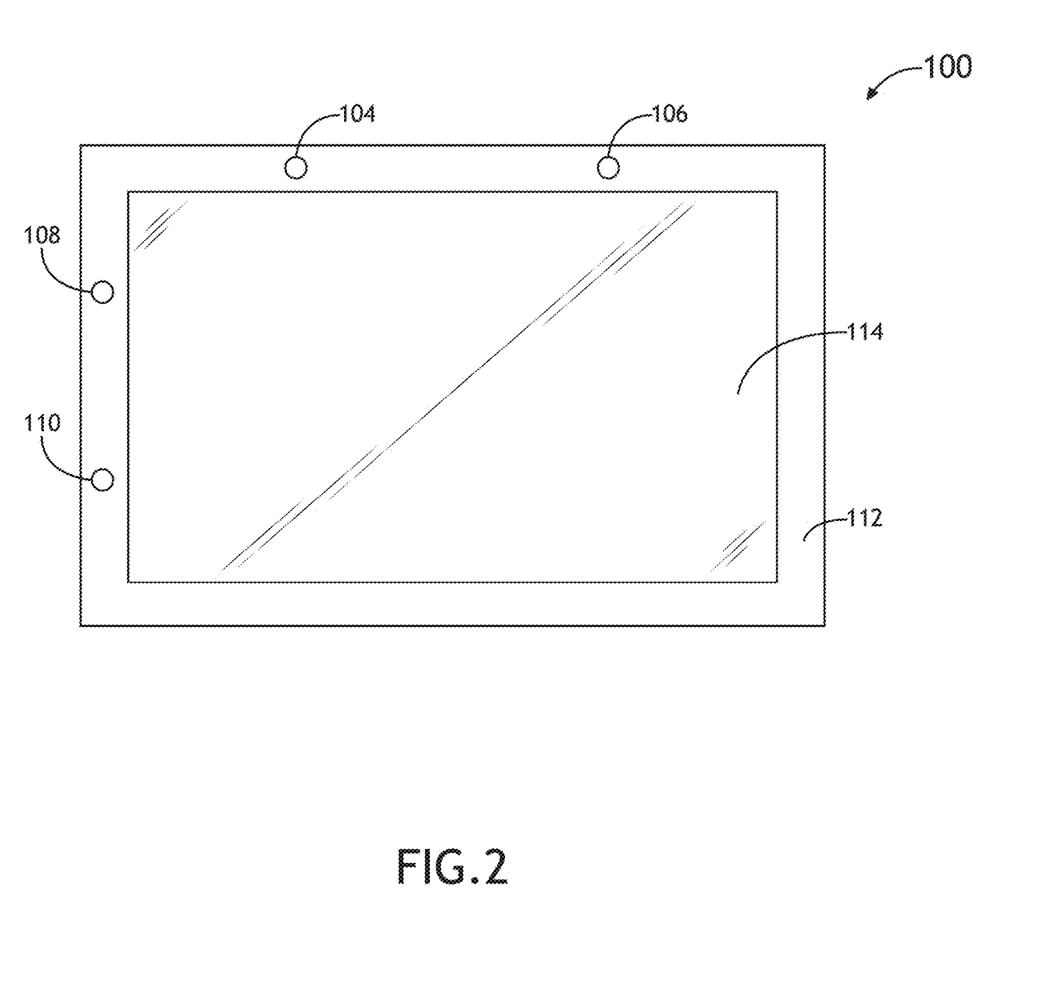
FIG. 2 is a front view of a display device utilizing a plurality of visual indicators.
Figure 3:
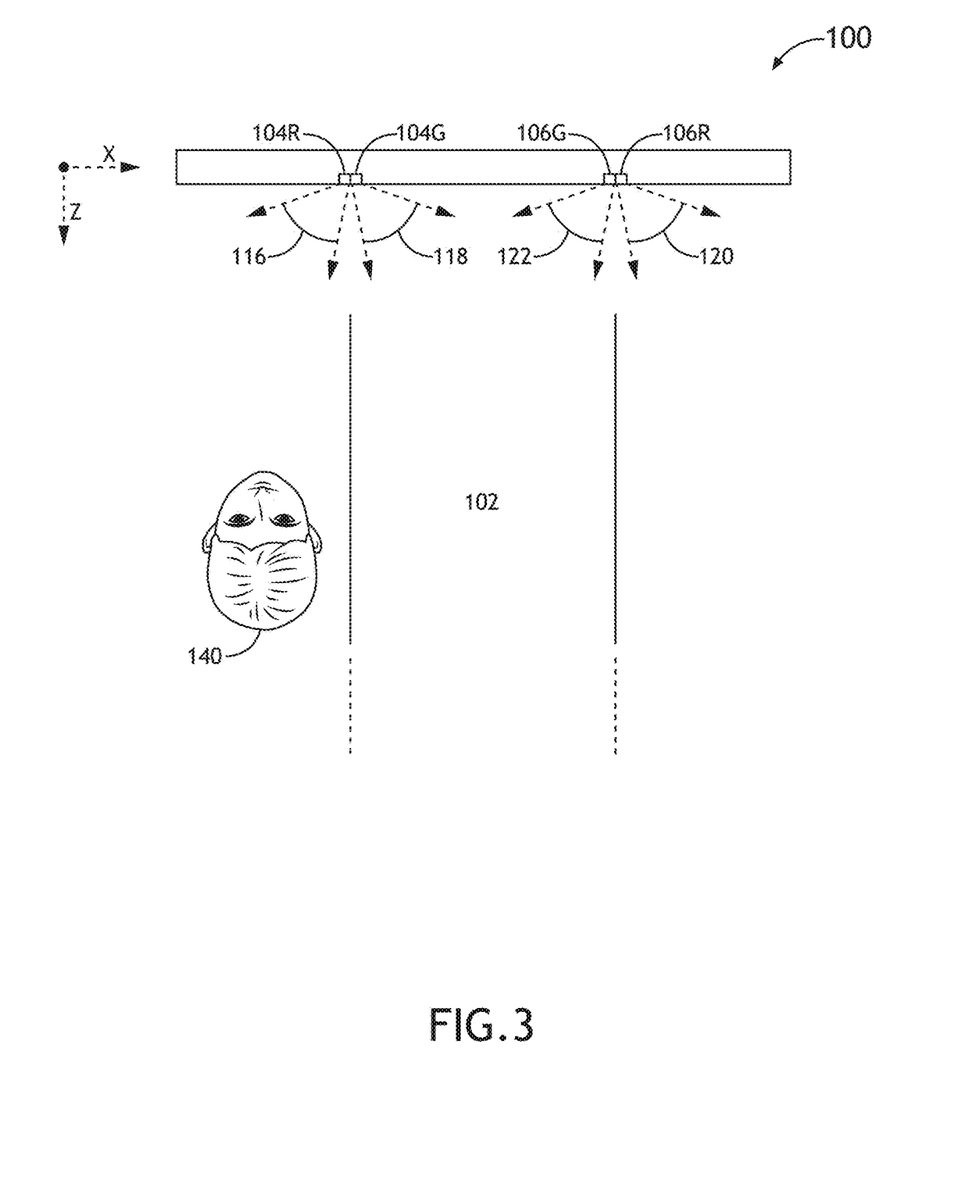
FIG. 3 is a top view of the display device shown in FIG. 2.
Figure 4:
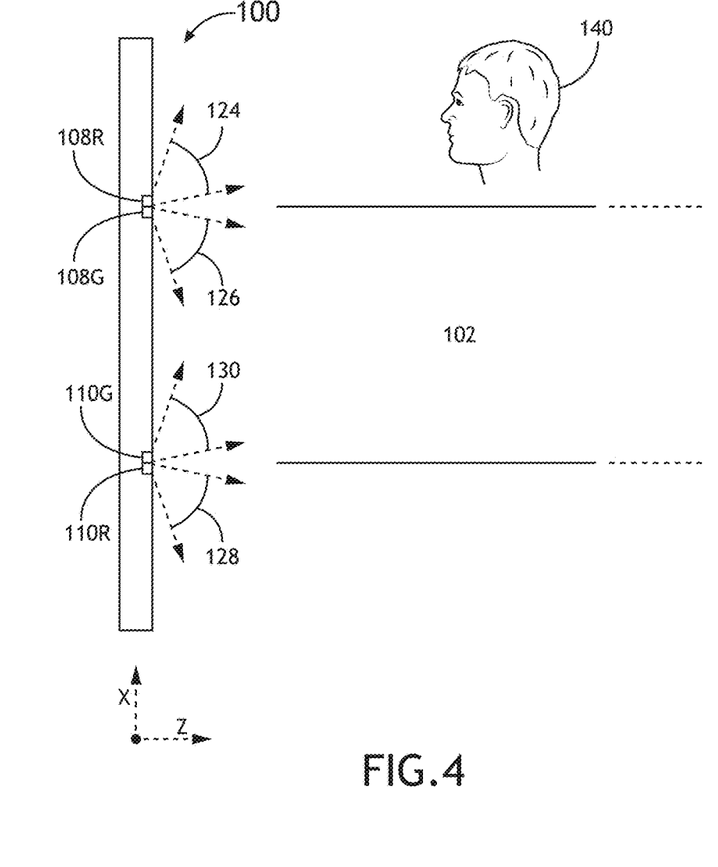
FIG. 4 is a side view of the display device shown in FIG. 2.

Referring generally to FIGS. 2 through 4, illustrations depicting a plurality of visual indicators 104, 106, 108, and 110 positioned on an outside frame (commonly referred to as the bezel) 112 around a screen 114 of the 3D display 100 are shown. In some embodiments, each visual indicator 104, 106, 108, and 110 may include directional light emitters that emit directional light only visible when viewed from certain angles. More specifically, as depicted in the top view shown in FIG. 3, the visual indicator 104 may include a first directional light emitter 104R configured to emit red light in a direction 116 and a second directional light emitter 104G configured to emit green light in another direction 118. Similarly, the visual indicator 106 may include a first directional light emitter 106R configured to emit red light in a direction 120 and a second directional light emitter 106G configured to emit green light in another direction 122. Furthermore, it is noted that the visual indicators 104 and 106 may be purposely positioned to coincide with boundaries of the head box 102 with respect to the horizontal (x-axis). The visual indicators 104 and 106 configured in this manner may be referred to as horizontal boundary indicators.

From the perspective of a viewer 140, as long as the head position of the viewer 140 stays within the defined horizontal boundaries of the head box 102, the viewer 140 only sees green light from the visual indicators 104 and 106. On the other hand, if the head position of the viewer 140 leaves the head box 102 and moves too far left, for example, the green light from the visual indicator 104 becomes invisible and the viewer 140 instead sees red light from the visual indicator 104, which provides an intuitive visual indication to the viewer 140 that the head position of the viewer 140 is too far left and improper viewing of the 3D display 100 may occur.

It is to be understood that the directional light emitters within each visual indicator (e.g., 104R and 104G) are shown side-by-side merely for illustrative purposes. It is contemplated that the directional light emitters within each visual indicator (e.g., 104R and 104G) may also be arranged top-and-bottom, stacked, or in various other manners without departing from the broad scope of the inventive concepts disclosed herein.

It is also contemplated that the visual indicators 108 and 110 may be configured in a similar manner and utilized for indicating the vertical (y-axis) boundaries of the head box 102. More specifically, as depicted in the side view shown in FIG. 4, the visual indicator 108 may include a first directional light emitter 108R configured to emit red light in a direction 124 and a second directional light emitter 108G configured to emit green light in another direction 126. Similarly, the visual indicator 110 may include a first directional light emitter 110R configured to emit red light in a direction 128 and a second directional light emitter 110G configured to emit green light in another direction 130. It is noted that the visual indicators 108 and 110 may be purposely positioned to coincide with boundaries of the head box 102 with respect to the vertical (y-axis).

From the perspective of the viewer 140, as long as the head position of the viewer 140 stays within the defined vertical boundaries of the head box 102, the viewer 140 only sees green light from the visual indicators 108 and 110. On the other hand, if the head position of the viewer 140 leaves the head box 102 and moves too high, for example, the green light from the visual indicator 108 becomes invisible and the viewer 140 instead sees red light from the visual indicator 108, which provides an intuitive visual indication to the viewer 140 that the head position of the viewer 140 is too high and improper viewing of the 3D display 100 may occur.

Figure 5:
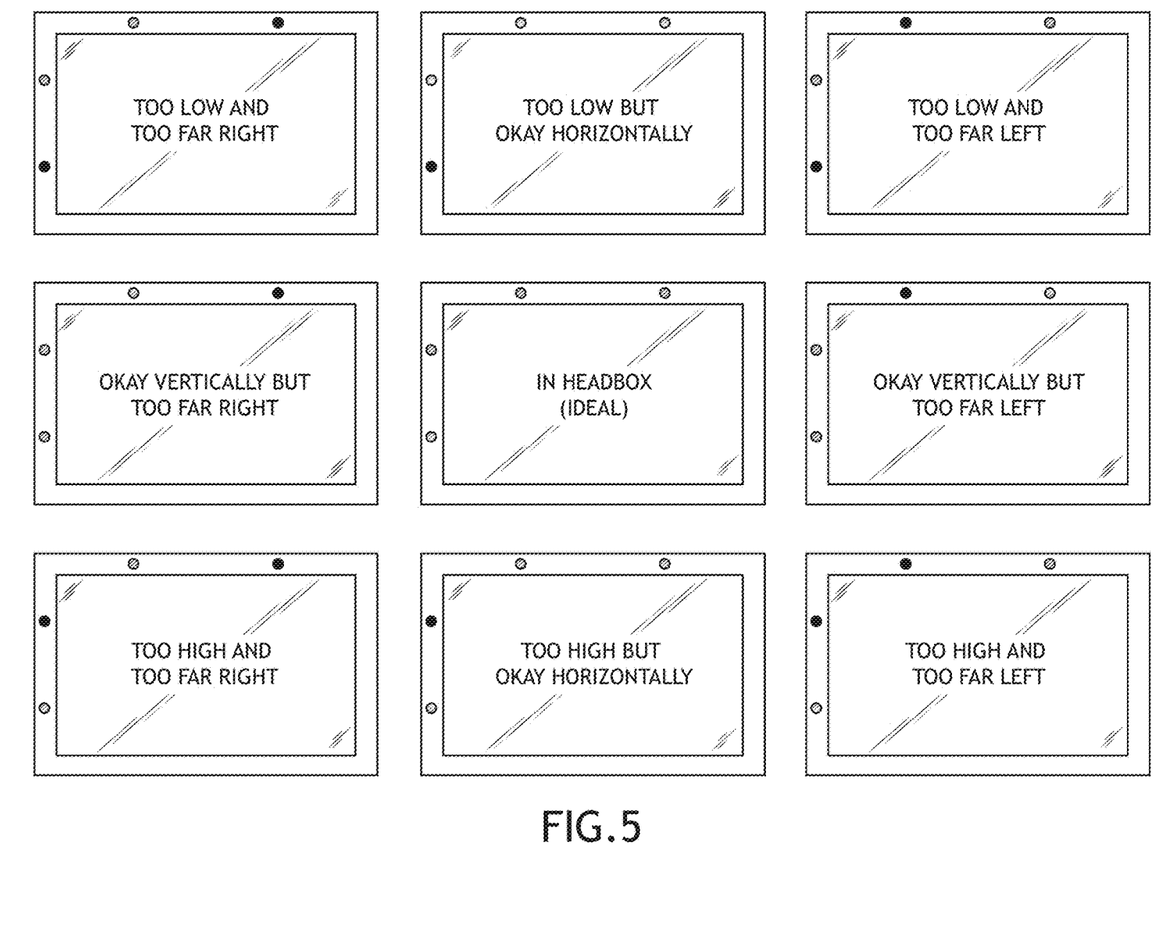
FIG. 5 is an illustration depicting various positional indications that can be provided utilizing the plurality of visual indicators shown in FIG. 2.

FIG. 5 is an illustration depicting various positional indications that can be provided utilizing the visual indicators 104, 106, 108, and 110 described above. It is noted that the visual indicators 104, 106, 108, and 110 are sufficient to cover all possible combinations of horizontal and vertical positions with respect to the position of the head box 102 without the need for complex and expensive head tracking sensors or devices.

It is contemplated that the visual indicators 104, 106, 108, and 110 may include more than two directional light emitters. For instance, in addition to the red and green emitters described above, a yellow emitter may be configured to emit yellow light in a direction between the red and green emitters, visually indicating a transitional region to the viewer 140. In this manner, when yellow light becomes visible to the viewer 140, the viewer 140 may consider taking corrective actions before moving too far out of the head box 102, in which case red light would become visible as previously described.

It is to be understood that the color choices of red, green, and/or yellow described in the examples above are merely exemplary. Color choices may vary without departing from the broad scope of the inventive concepts disclosed herein as long as the visual indicators 104, 106, 108, and 110 are configured to be visually distinguishable for the purpose of indicating head box 102 boundaries.

It is also contemplated that the visual indicators 104, 106, 108, and 110 may be configured to only emit directional light in directions that are outside of the head box 102 in some embodiments. In other words, the visual indicators 104, 106, 108, and 110 may appear unlit from the perspective of the viewer 140 if the head position of the viewer 140 is within the head box 102. The viewer 140 may only see directional light from the visual indicators 104, 106, 108, or 110 when the head position of the viewer 140 moves outside of the head box 102. It is to be understood that in such embodiments, wherein the visual indicators 104, 106, 108, and 110 are configured to only emit directional light in directions that are outside of the head box 102, the visual indicators 104, 106, 108, and 110 can be colored in any manner without departing from the broad scope of the inventive concepts disclosed herein.

Alternatively, the visual indicators 104, 106, 108, and 110 may be configured to only emit directional light in directions that are visible from within the head box 102 in some embodiments. In other words, the visual indicators 104, 106, 108, and 110 may appear unlit from the perspective of the viewer 140 if the head position of the viewer 140 is outside of the head box 102. It is contemplated that whether to configure the visual indicators 104, 106, 108 and 110 to be visible or invisible from within the head box 102 may vary based on specific implementations without departing from the broad scope of the inventive concepts disclosed herein.

Figure 6:
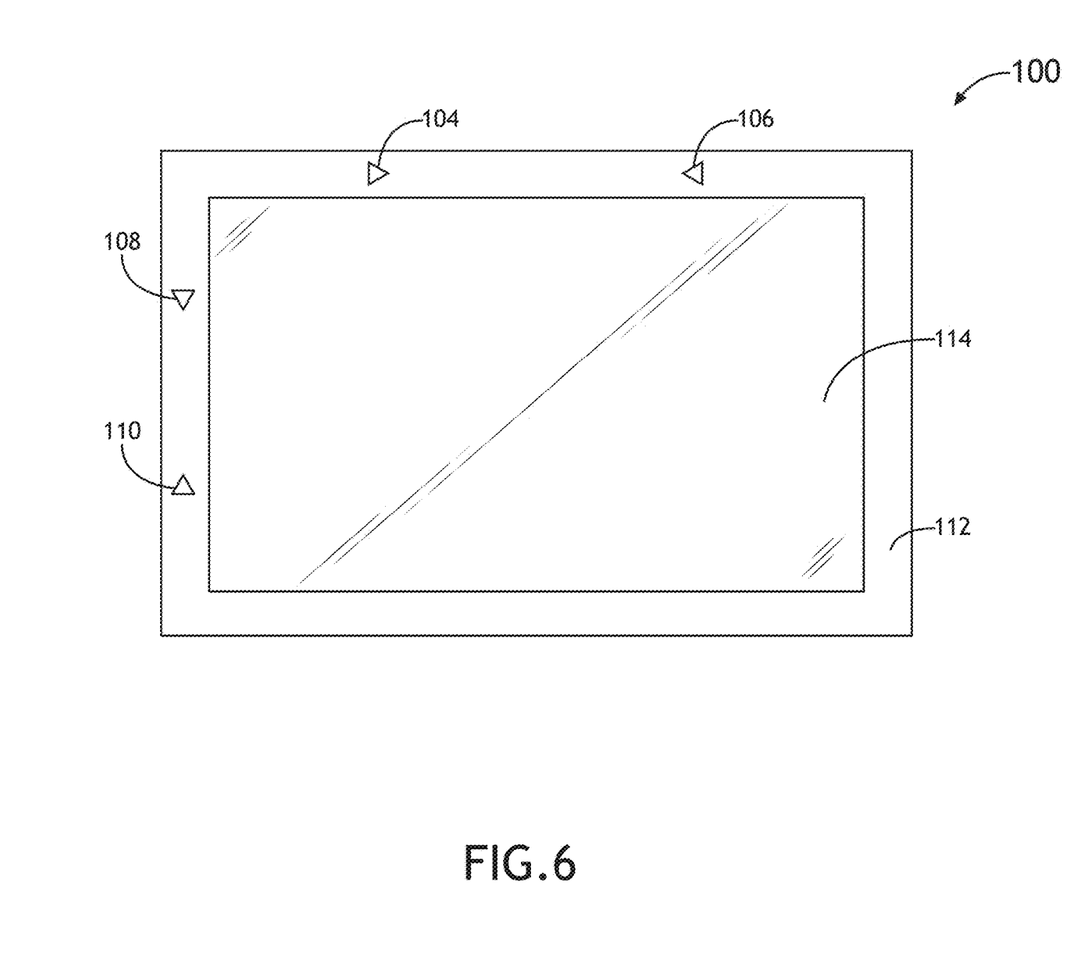
FIG. 6 is a front view of another display device utilizing plurality of visual indicators.

It is further contemplated that the circular shapes of the visual indicators 104, 106, 108, and 110 are exemplary, and they may vary without departing from the broad scope of the inventive concepts disclosed herein. For example, as shown in FIG. 6, each visual indicator 104, 106, 108, and 110 may correspond to a shape pointing toward the head box 102. In this manner, if the head position of the viewer 140 leaves the head box 102 and moves too high, for example, the visual indicator 108 may become visible to the viewer 140 and indicate to the viewer 140 to move downward into the head box 102. It is contemplated that the different shapes of the visual indicators 104, 106, 108, and 110 may be realized using shape masks or may be formed utilizing a number of small emitters. Other techniques for shaping the appearances of the visual indicators 104, 106, 108, and 110 may also be utilized.

Furthermore, it is contemplated that the visual indicators 104, 106, 108, and 110 may be configured to be compatible with night vision devices (e.g., night vision goggles or the like). For instance, the light emitters utilized by the visual indicators 104, 106, 108, and 110 may be configured to emit light of certain spectrum, color and/or brightness settings that are compatible with a given night vision device. Alternatively and/or additionally, the light emitters utilized by the visual indicators 104, 106, 108, and 110 may support a day light operation mode and a night vision operation mode, allowing the viewer 140 to selectively engage one of the operation modes as needed. It is contemplated that ambient light sensor(s) may also be utilized to automate the operation mode selection process without departing from the broad scope of the inventive concepts disclosed herein.

Figure 7:
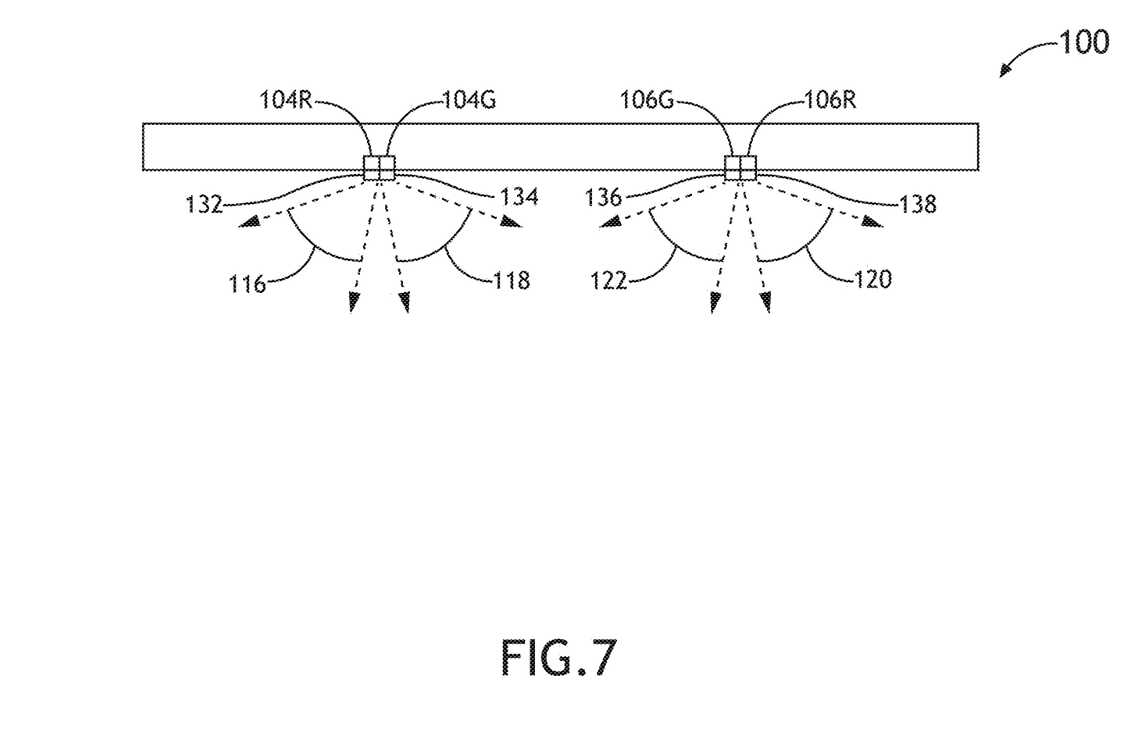
FIG. 7 is a top view of a display device utilizing optical filters.

It is noted that the examples described above referenced directional light emitters as light sources for the visual indicators 104, 106, 108, and 110. While using directional light emitters (sources) is one way of controlling visibilities of the visual indicators 104, 106, 108, and 110 from the perspective of the viewer 140, other techniques may be utilized to control visibilities of the visual indicators 104, 106, 108, and 110 as well. For instance, optical filters (e.g., polarizers) may be utilized in some embodiments to block light at certain angles. Referring to an example depicted in FIG. 7, suppose the light emitter 104R is a red light source and the light emitter 104G is a green light source, a polarizer 132 may be utilized to block light emitted by the light emitter 104R in the direction 118 (i.e., allow the light emitter 104R to be visible only in the direction 116) and another polarizer 134 may be utilized to block light emitted by the light emitter 104G in the direction 116 (i.e., allow the light emitter 104G to be visible only in the direction 118). By configuring polarizers 136 and 138 in a similar manner, the visual indicators 104 and 106 may effectively function the same way as the visual indicators 104 and 106 previously described in FIG. 3. It is therefore contemplated that different techniques for controlling visibilities of the visual indicators 104, 106, 108, and 110 may be utilized without departing from the broad scope of the inventive concepts disclosed herein. It is to be understood that whether to utilize directional light emitters or optical filters may be determined based on various factors including cost, space availability and the like.

It is further contemplated that optical filters (e.g., polarizers) may be utilized to selectively block visibility of the screen 114 in some embodiments. More specifically, one or more optical filters may be utilized to block viewing angles from all but within the head box 102, effectively eliminating improper viewing of the 3D display 100.

Figure 8:
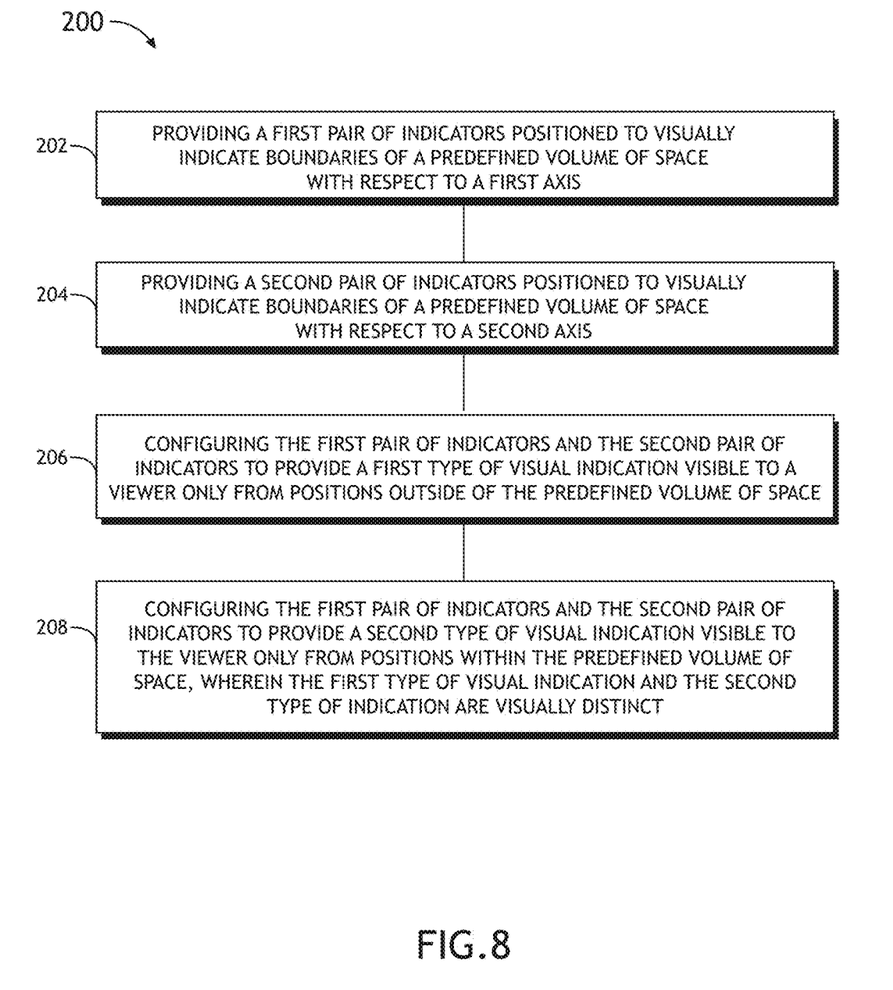
FIG. 8 is a flow diagram depicting a method utilizing boundary indication techniques in accordance with the inventive concepts disclosed herein.

Referring now to FIG. 8, a flow diagram depicting an embodiment of a method 200 utilizing 3D boundary indication techniques as described above is shown. In accordance with the inventive concepts disclosed herein, at least one pair of horizontal (x-axis) boundary indicators are provided in a step 202. The horizontal boundary indicators are positioned and utilized to visually indicate the horizontal boundaries of a predefined volume of space (e.g., 3D space). In addition, at least one pair of vertical (y-axis) boundary indicators are provided in a step 204. The vertical boundary indicators are positioned and utilized to visually indicate the vertical boundaries of the predefined 3D space.

In some embodiments, both the horizontal and the vertical boundary indicators are configured to provide a first type of visual indications that are visible to a viewer from positions outside of the predefined 3D space in a step 206. Such visual indications may be presented using a particular choice of color (e.g., red in the examples above) and/or a particular choice of shape (e.g., a triangle or an arrow shown in the examples above), indicating to the viewer that corrective actions are needed when such visual indications become visible. Additionally and/or alternatively, the horizontal and the vertical boundary indicators may be configured to provide a second type of visual indications that are visually distinct from the first type of visual indications. In some embodiments, the second type of visual indications may be visible to the viewer from positions within the predefined 3D space in a step 208. It is to be understood that the second type of visual indications may be presented using a particular choice of color (e.g., green in the examples above) or shape. It is also to be understood that providing the second type of visual indications may be optional; the lack of visual indication (e.g., blank or unlit boundary indicators) may be recognized by the viewer as an indication that the viewer is within the predefined 3D space.

To reiterate, the 3D boundary indication techniques in accordance with the inventive concepts disclosed herein provide effective visual indications regarding horizontal and vertical positions with respect to a given 3D space without the need for complex and expensive head tracking sensors or devices. It is contemplated that the 3D boundary indication techniques in accordance with the inventive concepts disclosed herein may be configured to indicate improper (or proper) viewing angles of a display device as previously described. Furthermore, it is contemplated that the 3D space boundary indication techniques disclosed herein may be utilized for other purposes as well, without departing from the broad scope of the inventive concepts disclosed herein.

Figure 9:
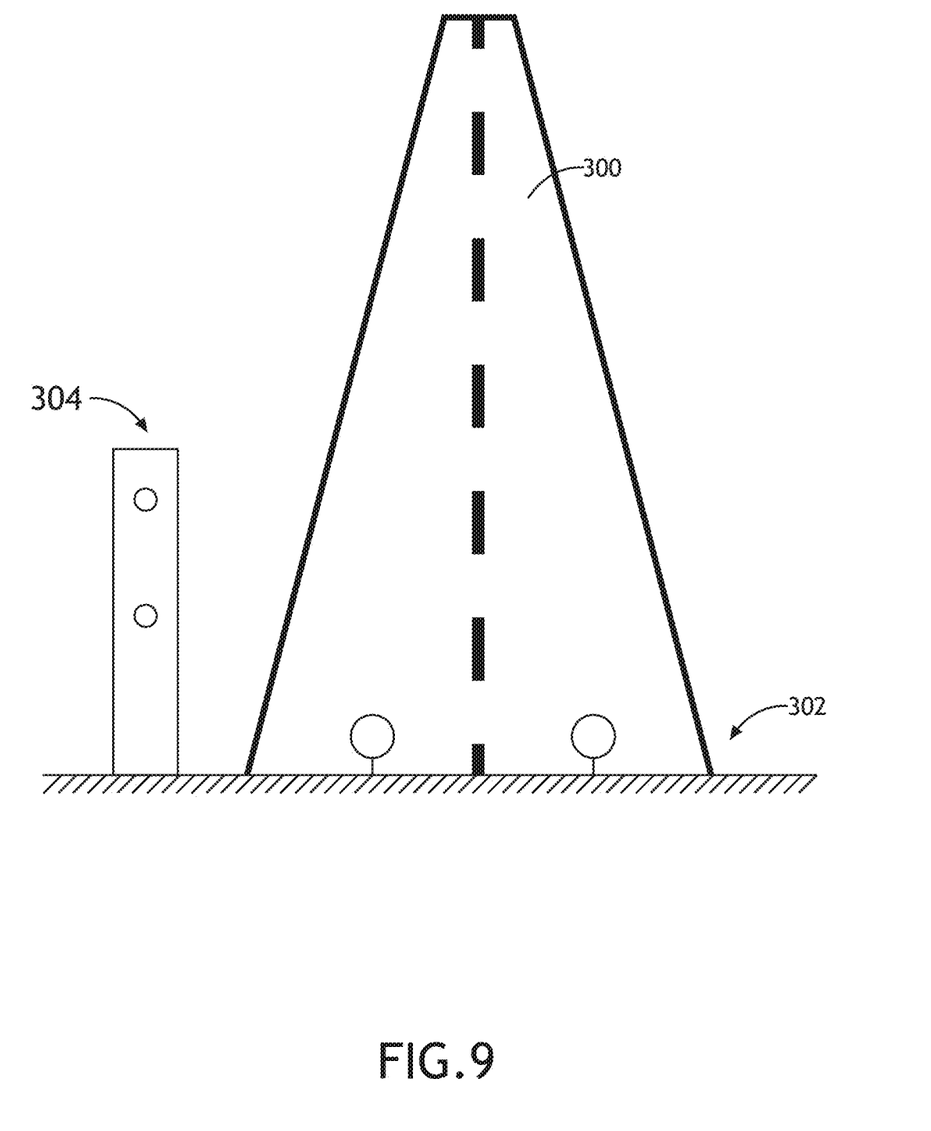
FIG. 9 is an illustration depicting a runway utilizing a plurality of visual indicators in accordance with the inventive concepts disclosed herein.

For instance, the 3D boundary indication techniques disclosed herein may be utilized to provide indications to a pilot making a visual approach to a runway. More specifically, current implementations of visual approach slope indicators utilize a set of lights on the side of an airport runway to provide visual descent guidance information during approach. The 3D boundary indication techniques disclosed herein, on the other hand, may provide more intuitive indications compared to the current implementations. Referring to an example shown in FIG. 9, a pair of horizontal boundary indicators 302 may be positioned on the ground facing an aircraft approaching a runway 300. Similarly, a pair of vertical boundary indicators 304 may be positioned on the side of the runway 300. The horizontal boundary indicators 302 and the vertical boundary indicators 304 may function in the same manner as previously described to visually indicate boundaries of an ideal "corridor" for approaching the runway 300. It is contemplated that the 3D space boundary indication techniques may be utilized in various other types of applications as well.

It is to be understood that the present disclosure may be conveniently implemented in forms of a software, hardware or firmware package. It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A method, comprising:
    providing a first pair of indicators positioned to visually indicate boundaries of a predefined volume of space in front of an object with respect to a first axis, the first pair of indicators being stationary relative to the predefined volume of space;
    providing a second pair of indicators positioned to visually indicate boundaries of the predefined volume of space in front of the object with respect to a second axis, the second pair of indicators being stationary relative to the predefined volume of space; and
    configuring the first pair of indicators and the second pair of indicators to provide a first type of visual indication visible to a viewer only from positions outside of the predefined volume of space, the predefined volume of space being stationary relative to the object.

2. The method of claim 1, wherein the first axis is a horizontal axis and the second axis is a vertical axis.

3. The method of claim 1, wherein the first pair of indicators are directional indicators fixedly positioned to coincide with boundaries of the predefined volume of space with respect to the first axis and the second pair of indicators are directional indicators fixedly positioned to coincide with boundaries of the predefined volume of space with respect to the second axis.

4. The method of claim 1, further comprising:
    configuring the first pair of indicators and the second pair of indicators to provide a second type of visual indication visible to the viewer only from positions within the predefined volume of space, wherein the first type of visual indication and the second type of visual indication are visually distinct.

5. The method of claim 4, further comprising:
    configuring the first pair of indicators and the second pair of indicators to provide a third type of visual indication visible to the viewer only from positions within a transitional region defined generally along the boundaries of the predefined volume of space, wherein the first type of visual indication, the second type of visual indication, and the third type of visual indication are visually distinct.

6. The method of claim 1, wherein the first pair of indicators and the second pair of indicators are provided to visually indicate improper viewing angles of a display.

7. The method of claim 1, wherein the first pair of indicators and the second pair of indicators are provided to facilitate visual approach to a runway.

8. An apparatus, comprising:
    a first pair of indicators positioned to visually indicate boundaries of a predefined volume of space in front of an object with respect to a first axis, the first pair of indicators being stationary relative to the predefined volume of space; and
    a second pair of indicators positioned to visually indicate boundaries of the predefined volume of space in front of the object with respect to a second axis, the second pair of indicators being stationary relative to the predefined volume of space,
    wherein the first pair of indicators and the second pair of indicators are configured to provide a first type of visual indication visible to a viewer only from positions outside of the predefined volume of space, and wherein the predefined volume of space is stationary relative to the object.

9. The apparatus of claim 8, wherein the first axis is a horizontal axis and the second axis is a vertical axis.

10. The apparatus of claim 8, wherein the first pair of indicators are directional indicators fixedly positioned to coincide with boundaries of the predefined volume of space with respect to the first axis and the second pair of indicators are directional indicators fixedly positioned to coincide with boundaries of the predefined volume of space with respect to the second axis.

11. The apparatus of claim 8, wherein the first pair of indicators and the second pair of indicators include directional light emitters configured to provide the first type of visual indication visible to the viewer only from positions outside of the predefined volume of space.

12. The apparatus of claim 8, wherein the first pair of indicators and the second pair of indicators include optical filters configured to block visibility of the first type of visual indication from positions within the predefined volume of space.

13. The apparatus of claim 8, wherein the first pair of indicators and the second pair of indicators are further configured to provide a second type of visual indication visible to the viewer only from positions within the predefined volume of space, wherein the first type of visual indication and the second type of visual indication are visually distinct.

14. The apparatus of claim 13, wherein the first pair of indicators and the second pair of indicators are further configured to provide a third type of visual indication visible to the viewer only from positions within a transitional region defined generally along the boundaries of the predefined volume of space, wherein the first type of visual indication, the second type of visual indication, and the third type of visual indication are visually distinct.

15. A display device, comprising:
    a screen;
    a first pair of indicators positioned to visually indicate boundaries of a predefined volume of space in front of the screen with respect to a horizontal axis, the first pair of indicators being stationary relative to the predefined volume of space and stationary relative to the screen; and
    a second pair of indicators positioned to visually indicate boundaries of the predefined volume of space in front of the screen with respect to a vertical axis, the second pair of indicators being stationary relative to the predefined volume of space and stationary relative to the screen,
    wherein the first pair of indicators and the second pair of indicators are configured to provide a first type of visual indication visible to a viewer only from positions outside of the predefined volume of space.

16. The display device of claim 15, wherein the first pair of indicators are positioned to coincide with boundaries of the predefined volume of space with respect to the horizontal axis and the second pair of indicators are positioned to coincide with boundaries of the predefined volume of space with respect to the vertical axis.

17. The display device of claim 15, wherein the first pair of indicators and the second pair of indicators include directional light emitters configured to provide the first type of visual indication visible to the viewer only from positions outside of the predefined volume of space.

18. The display device of claim 15, wherein the first pair of indicators and the second pair of indicators include optical filters configured to block visibility of the first type of visual indication from positions within the predefined volume of space.

19. The display device of claim 15, wherein the first pair of indicators and the second pair of indicators are further configured to provide a second type of visual indication visible to the viewer only from positions within the predefined volume of space, wherein the first type of visual indication and the second type of visual indication are visually distinct.

20. The display device of claim 19, wherein the first pair of indicators and the second pair of indicators are further configured to provide a third type of visual indication visible to the viewer only from positions within a transitional region defined generally along the boundaries of the predefined volume of space, wherein the first type of visual indication, the second type of visual indication, and the third type of visual indication are visually distinct.

* * * * *